United States Patent [19]
Mochizuki

[11] Patent Number: 5,371,645
[45] Date of Patent: Dec. 6, 1994

[54] INVERTER AIR CONDITIONER

[75] Inventor: Shoji Mochizuki, Shizuoka, Japan

[73] Assignee: Mitsubishi Denki Kabushiki Kaisha, Tokyo, Japan

[21] Appl. No.: 960,699

[22] Filed: Oct. 14, 1992

[30] Foreign Application Priority Data

Oct. 23, 1991 [JP] Japan .................. 3-275303

[51] Int. Cl.$^5$ .................................. H02H 7/00
[52] U.S. Cl. .................................. 361/22
[58] Field of Search .............. 361/23, 31, 33, 30, 361/93, 88, 22; 62/228.1, 230

[56] References Cited

U.S. PATENT DOCUMENTS 4,736,595 4/1988 Kato .................... 62/230

FOREIGN PATENT DOCUMENTS 1298993 12/1989 Japan .
1300076 12/1989 Japan .
345193 2/1991 Japan .

OTHER PUBLICATIONS

Patent Abstracts of Japan, vol. 8, No. 83 (N-290), Apr. 17, 1984, & JP-A-59 000 581, Jan. 5, 1984.
Patent Abstracts of Japan, vol. 15, No. 101 (N-1091), Mar. 11, 1991, & JP-A-30 00 519, Jan. 7, 1991.
Patent Abstracts of Japan, vol. 14, No. 87 (M-937), Feb. 19, 1990, & JP-A-13 00 076, Dec. 4, 1989.

Primary Examiner—A. D. Pellinen
Assistant Examiner—Sally C. Medley
Attorney, Agent, or Firm—Oblon, Spivak, McClelland, Maier & Neustadt

[57] ABSTRACT

An inverter air conditioner controller includes an ac/dc converter for changing ac power into dc power, a dc/ac inverter for changing dc power into ac power having a desired frequency and a desired voltage to drive a compressor, compressor lock presumption unit for preliminarily determining whether a compressor lock occurs, and frequency increasing unit for increasing an operational frequency to a desired value. When it is presumed that compressor lock occurs, the operational frequency is increased. If the operational current value then reaches an overcurrent detection level, a lock protection unit for activates an overcurrent breaker to stop the compressor.

4 Claims, 13 Drawing Sheets

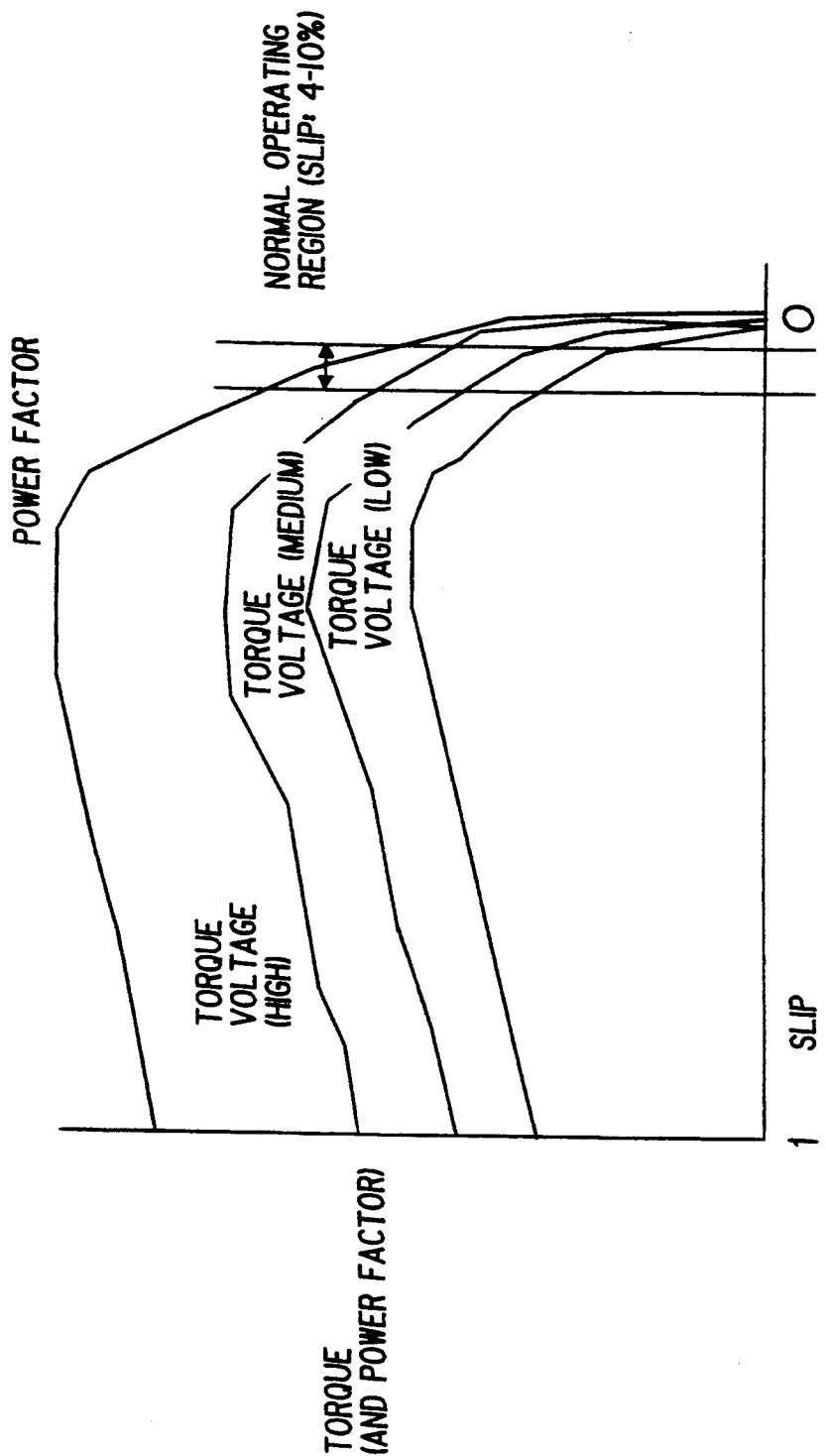

INVERTER AIR CONDITIONER

The present invention generally relates to a control device for an inverter air conditioner, and more particularly to a control device for an inverter air conditioner with a lock presumption circuit.

The operation range of an inverter air conditioner has recently been expanded to the low frequency side. However, overcurrent break lock protection against a dc power source (corresponding to the operational current of a compressor) does not work in a satisfactory manner in a low frequency range. In order to cope with this problem, there has been proposed a solution to periodically raise the operational frequency of the input current at certain time intervals as disclosed in Japanese Unexamined Patent Publication No. 300076/1989.

A conventional system is shown in FIG. 11 to include operating period counting means and frequency raising means, the counting of an operating period, and raising an operating frequency at certain time intervals. The structure of the conventional system will be explained in reference to FIG. 11. The conventional inverter air conditioner is constituted by a converter (an ac/dc converter) 4 for changing commercial power into dc power, an inverter (a dc/ac inverter) 6 for changing dc power into ac power, a compressor 7 having an electric motor and a compressing mechanism to compress and circulate a refrigerant, a waveform output circuit 24 for outputting a signal to the inverter 6, a shunt resistor 5 for detecting the dc component of a current flowing through the compressor 7, an overcurrent detecting circuit 21 for detecting an overcurrent, and operational frequency changing means 22 for raising the operational frequency at certain time intervals. Reference numeral 20 designates an outdoor controller.

The operation of the conventional inverter air conditioner will be described. In FIG. 11, the compressor 7 is driven by an ac power which is obtained by converting commercial power into dc power with the converter (ac/dc converter) 4, and inverting the dc power into three phase ac power with the inverter (dc/ac inverter) 6 based on a waveform signal from the waveform output circuit 24 so as to have a desired frequency and a desired voltage. While the compressor 7 is driven by the inverted ac power, a dc component of a current flowing through the compressor 7 is detected by the shunt resistor 5 and the overcurrent detecting circuit 21. Under certain conditions, such as a loss of lubricant, a short circuit, dust in the bearings, excessive backpressure of the refrigerant, etc. the compressor may stop operating and is said to be locked. When the compressor is locked, an overcurrent breaker is activated by sensing the output from the waveform output circuit. If a low frequency operation is required by an indoor controller (not shown), the operational frequency is raised by the operational frequency changing means 22 at certain time intervals to allow a stop operation by the overcurrent breaker when the compressor is locked.

The conventional inverter air conditioner is constructed as stated earlier to protect against compressor lock. However, the arrangement wherein the operational frequency is periodically raised irrespectively of the presence and absence of the compressor lock creates problems. If the time interval is too long, protection against an increase in temperature of a winding does not occur in time when the compressor is locked. If the time interval is too short, the actual operational frequency is extremely different from the desired operational frequency. The operational frequency constantly varies, and whenever the operational frequency changes, noise is generated which grates on the user's ear.

It is an object of the present invention to solve the problems, and to provide an inverter air conditioner capable of avoiding an unnecessary increase in an operational frequency, ensuring stability in a capacity control and noise prevention, and obtaining reliable lock protection by increasing the operational frequency only when it is presumed, i.e., it is preliminary determined, that a compressor is locked.

The foregoing and other object of the present invention have been attained by providing an inverter air conditioner comprising an ac/dc converter for changing an ac power into a dc power; a dc/ac inverter for changing the dc power into an ac power having a desired frequency and a desired voltage to drive a compressor; compressor lock presumption means for presuming whether a compressor lock occurs or not; frequency increasing means for increasing an operational frequency to a value when it is presumed that the compressor lock occurs, the value determined so that an operational current value reaches an overcurrent detection level; and lock protection means for making an overcurrent break to stop the compressor when the operational current is detected by an overcurrent detection circuit.

The compressor lock presumption means presumes the compressor lock based on an operational frequency and an inverter input current value, or an adjustment voltage of an input voltage to the compressor, or an output signal from either one of a speed detector and a position detector.

In accordance with the inverter air conditioner of the present invention, when an inverter input current is higher in comparison with the operational frequency or when the adjustment voltage of the compressor operational voltage is too high, or when it is detected that the speed of an electric motor is zero or that the rotational position of the electric motor does not change, it is presumed that the compressor is locked. When it is presumed that the compressor is locked, the operational frequency is periodically increased to a frequency level so that an overcurrent level can be detected when the compressor is actually locked. In this manner, when the compressor is mechanically locked, the lock protection can be done without failure.

As explained, the present invention can clear the noise problem due to an unnecessary change in the operational frequency, and realize a continuous operation at a low operational frequency with safety ensured.

In drawings:

FIG. 6 is a graph showing characteristics of the second embodiment;

Now, the present invention will be described in detail with reference to preferred embodiments illustrated in the accompanying drawings.

EMBODIMENT 1

Figure 1:
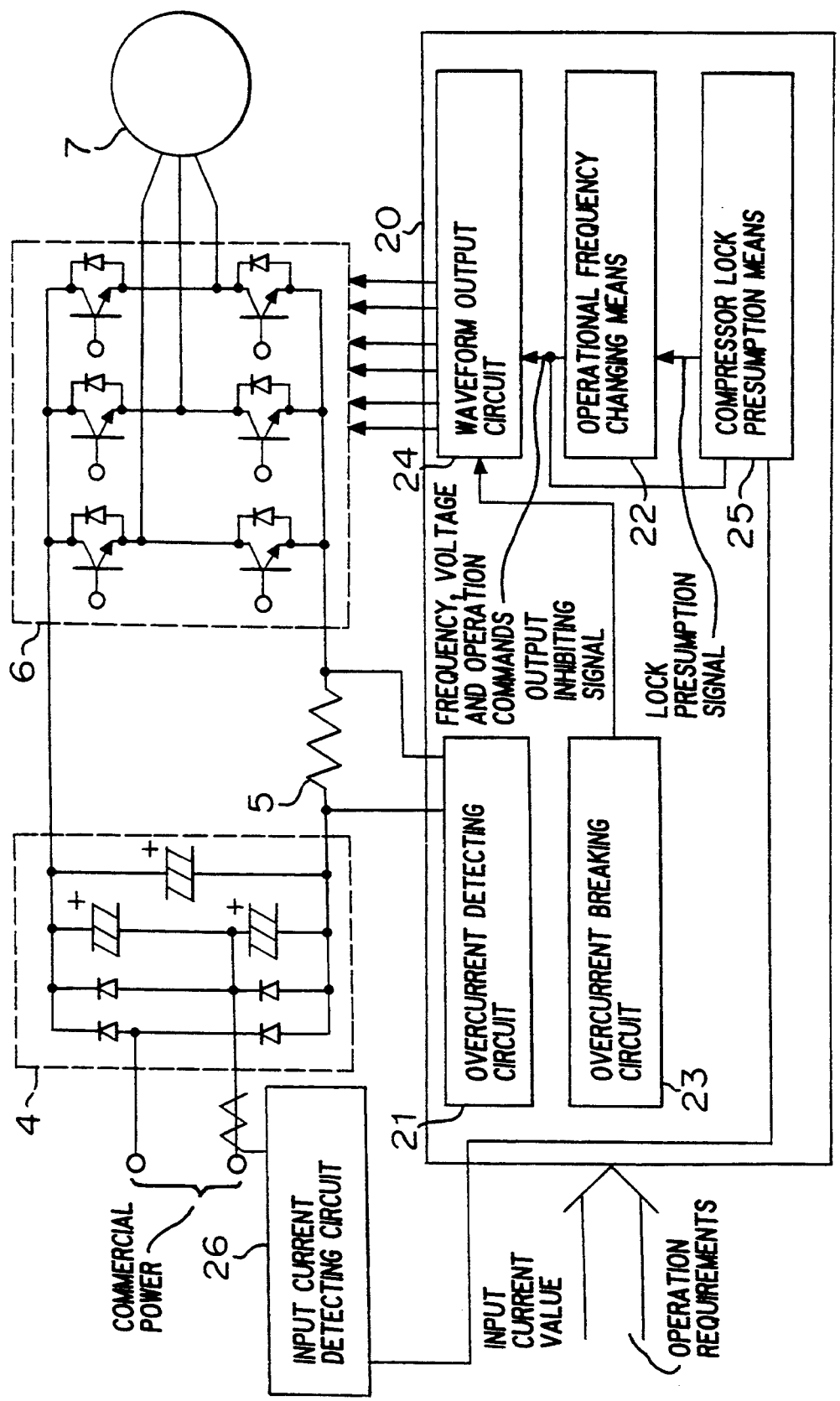
FIG. 1 is a block diagram of a controller for an inverter air conditioner according to a first embodiment of the present invention.

Referring now to FIG. 1, there is shown a block diagram showing the inverter air conditioner according to a first embodiment of the present invention. In FIG. 1, reference numeral 4 designates a converter which is constituted by rectifier diodes and electrolytic capacitors to convert commercial ac power into dc power. Reference numeral 5 designates a shunt resistor which detects a current. Reference numeral 6 designates an inverter which includes switching elements such as transistors. Reference numeral 7 designates a compressor which includes an electric motor and a compression mechanism to compress and circulate a refrigerant. Reference numeral 20 designates an outdoor controller. Reference numeral 21 designates an overcurrent detecting circuit which determines whether the current flowing through the shunt resistor 5 is an overcurrent or not. Reference numeral 23 designates an overcurrent breaking circuit which outputs a waveform output inhibit signal when the overcurrent is detected. Reference numeral 24 designates a waveform output circuit which outputs waveform signals indicative of a required operational frequency and a required voltage to the inverter 6. Reference numeral 26 designates an input current detecting circuit which detects an input current. Reference numeral 25 designates lock presumption means which presumes, based on the operational frequency and the input current value, whether the compressor is locked or not. Reference numeral 22 designates operational frequency changing means which is triggered by an output from the compressor lock presumption means 25 and periodically raises the operational frequency.

Figure 3:
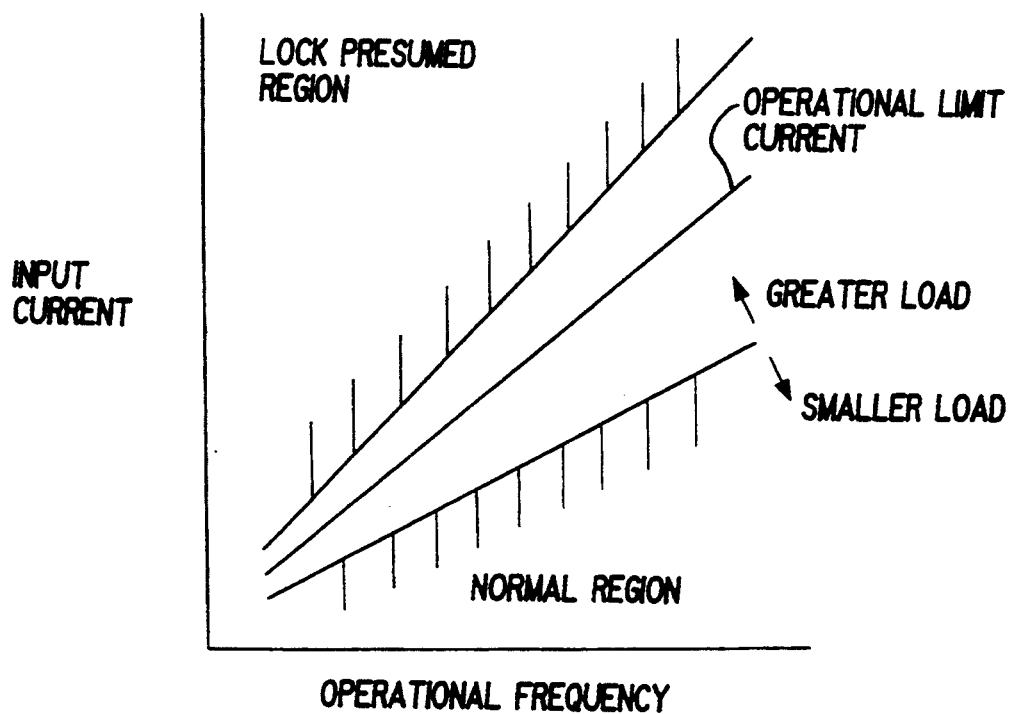
FIG. 3 is a graph showing characteristics of the first embodiment

The operation of the first embodiment will be explained. Referring now to FIG. 3, there is shown the relationship between the operational frequency and the input current. In FIG. 3, the area called "normal region" indicates states wherein the compressor is normally rotating without being locked. The area called "lock presumed region" indicates states wherein the compressor is mechanically locked. The input current becomes greater in proportion to the operational frequency, and the input current flows in an excessive manner in a locking state compared to normal operation. This means that a compressor lock can be presumed based on the operational frequency and the input current. The input current detecting circuit does not have a wide range of linearity, and the most accurate detection of the input current is required in the vicinity of the maximum current. This means that detection accuracy can not be expected at a low input. In addition, there can be a case where even in the normal region the input current in an overload operation is not very different from that in the compressor lock.

The operational limit current which is shown in FIG. 3 is a current value which is obtained when the operation is made under the maximum load conditions (specifically, set at 35° C. inside and at 43° C. outside in cooling) in an operation guarantee range.

Due to these matters, the compressor lock is not determined instantly from the relation between the operational frequency and the input current but the operational frequency is first raised. This prevents a stoppage due to a misdetermination from occurring, thereby making compressor lock determination more certain.

Figure 2A:
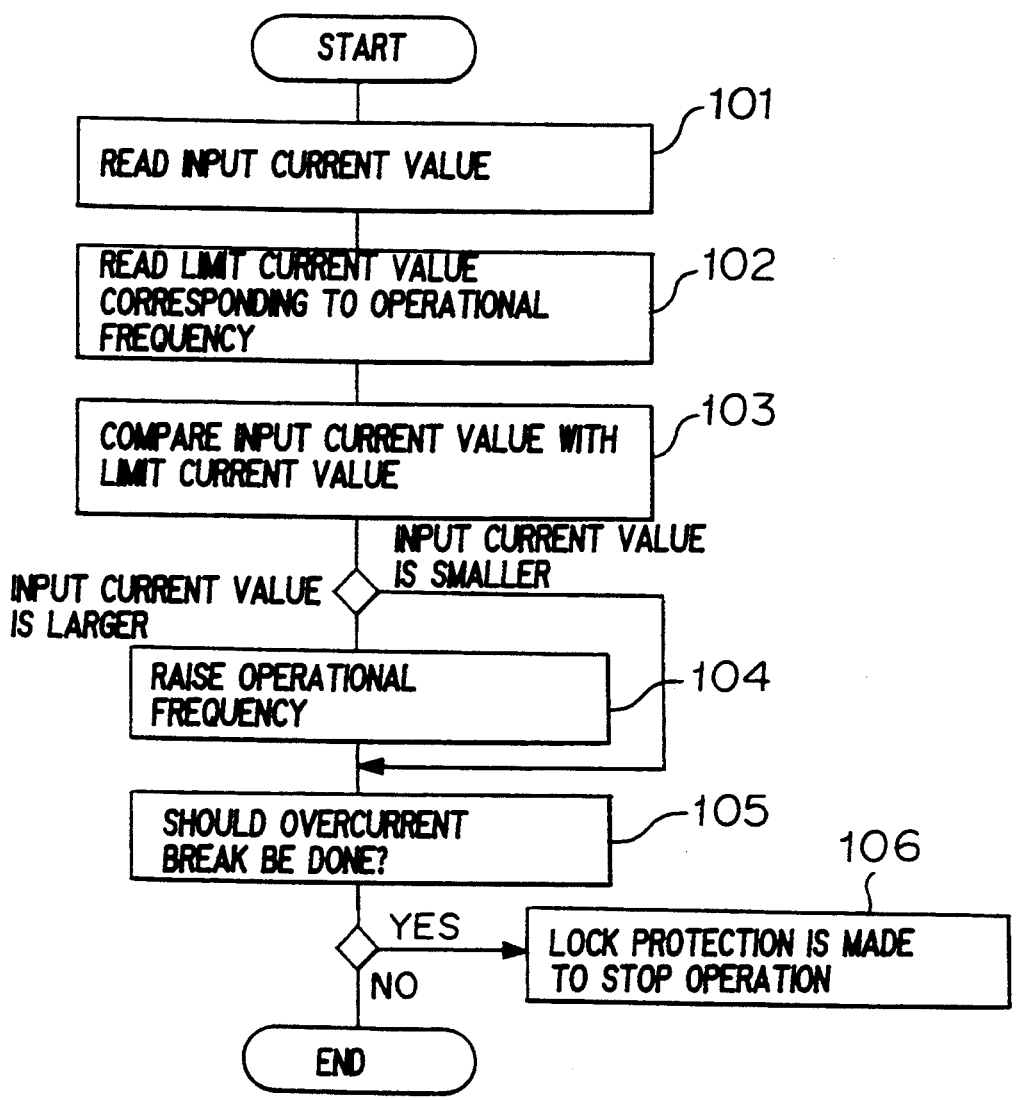
FIG. 2A is a flowchart of the operation of the first embodiment in which input current is monitored to presume occurrence of compressor lock.

The determination process will be explained in reference to the flowchart of FIG. 2A. First, an input current value is read by the input current detecting circuit 26 (Step 101). Then, a limit current value which corresponds to an operational frequency is read from the characteristic graph shown in FIG. 3 (Step 102). Next, the input current value is compared to the limit current value (Step 103). If the input current value is larger than the limit current value, it is presumed that the compressor is locked, and the operational frequency is raised (Step 104). Subsequently, it is determined whether the input current value is one at which a overcurrent break should be done (Step 105). If affirmative, it is determined that the compressor is mechanically locked, and the lock protection is made to stop the operation (Step 106).

Figure 2B:
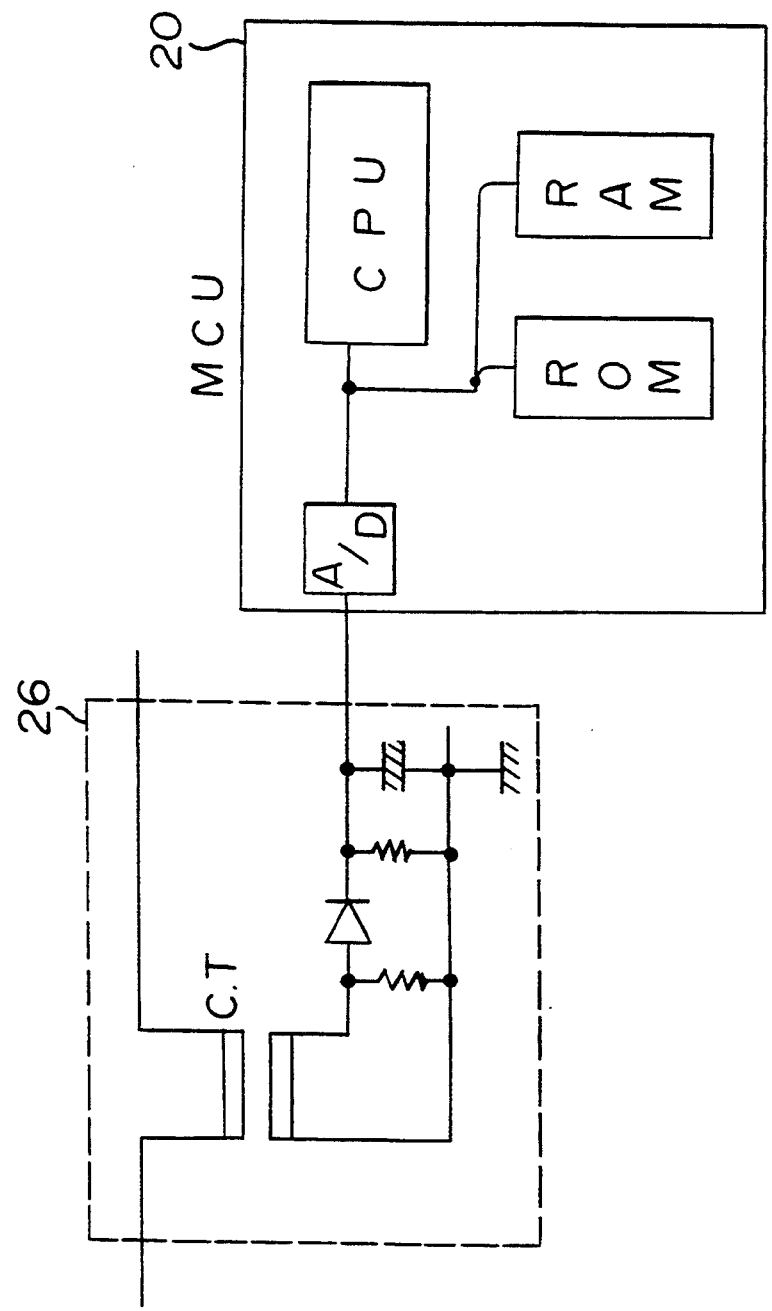
FIG. 2B is a circuit diagram which can carry out the steps of FIG. 2A.

The steps in the flowchart of the first embodiment can be carried out by e.g. a circuit which is shown in FIG. 2B. The word "MCU" represents a main control unit, which corresponds to the outdoor controller 20.

EMBODIMENT 2

Figure 4:
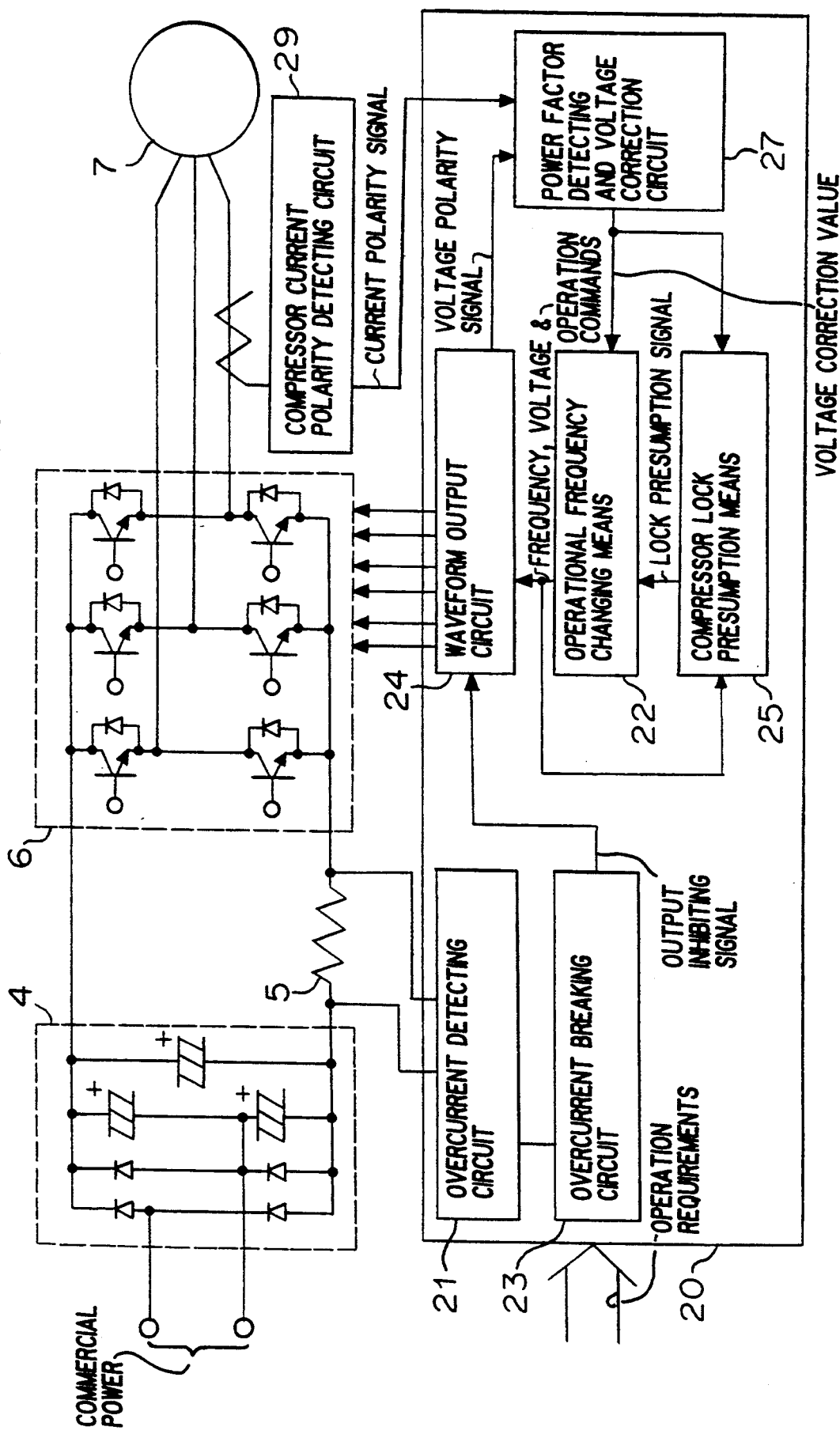
FIG. 4 is a block diagram of a controller for an inverter air conditioner according to a second embodiment of the present invention in which power factor is monitored to presume occurrence of compressor lock.

Referring now to FIG. 4, there is shown a block diagram showing the inverter air conditioner according to a second embodiment of the present invention. In FIG. 4, reference numeral 24 designates a waveform output circuit which outputs to an inverter 6 waveform signals indicative of a required operational frequency and a required voltage, and which has a voltage polarity signal added as an additional output. Reference numeral 29 designates a current polarity detecting circuit which detects the polarity of a compressor current. Reference numeral 27 designates a power factor detecting and voltage correction circuit which has been disclosed in Japanese Unexamined Patent Publication No. 298993/1989. Reference numeral 25 designates a compressor lock presumption means which presumes, based on an operational frequency and a voltage correction command value, whether a compressor is locked or not. Other elements are similar to those of the first embodiment.

The operation of the second embodiment will be explained. Referring now to FIG. 6, there is shown the relationship between a power factor, torque and a slip which indicates a difference between an operational frequency and the actual rotational frequency. In FIG. 6, signs "high", "medium" and "low" indicate applied voltages to the compressor. FIG. 6 shows that the compressor is in a locked state at the left edge, i.e. when the slip is 1. In a power factor control, when a power factor is high, the slip is great as is well known, and an applied voltage is raised to increase a torque, thereby optimizing the slip. This means that when the applied voltage is corrected to the maximum, it can be presumed that the compressor is locked.

Figure 5A:
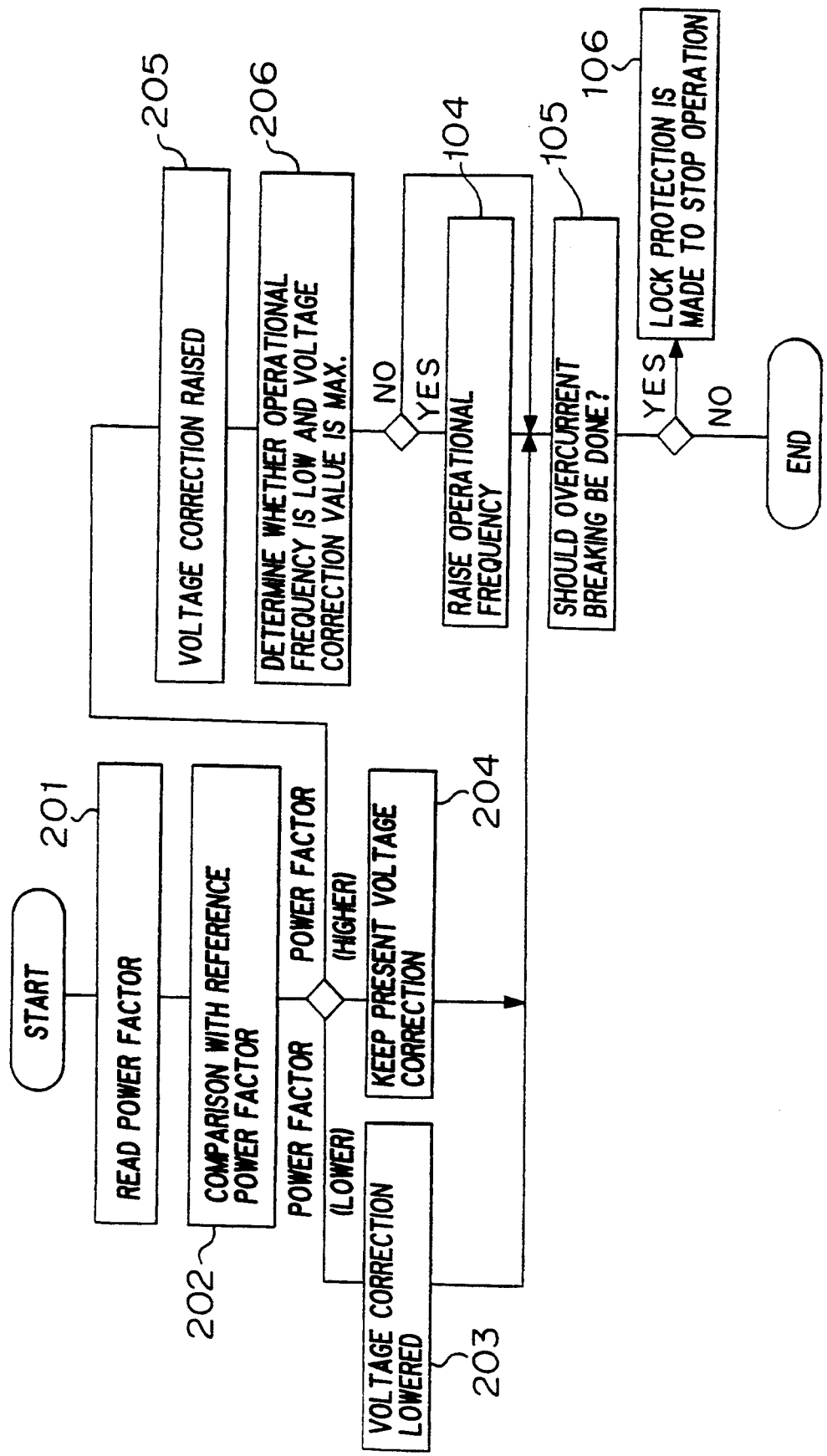
FIG. 5A is a flowchart of the operation of the second embodiment.

The compressor lock determination will be explained in reference to the flowchart of FIG. 5A. First, a power factor value is read based on a phase difference between a voltage polarity signal from the waveform output circuit 24 and a current polarity signal from the current polarity detecting circuit 29 shown in FIG. 4 (Step 201). Then, the read power factor value is compared to a reference power factor value (not shown) (Step 202). If the read power factor value is lower than the reference power factor value, it is determined that the applied voltage is too high, and a voltage correction value is lowered (Step 203). If the read power factor value is optimum, the present voltage correction is kept (Step 204). If the power factor value is higher than the reference power factor value, a voltage correction value is raised (Step 205). Next, it is determined whether an operational frequency is low and a voltage correction value is the maximum or not (Step 206). If affirmative, it is presumed that the compressor is locked, and the operational frequency is raised (Step 104). Subsequently, it is determined whether overcurrent breaking should be done or not (Step 105). If affirmative, it is determined that the compressor is mechanically locked, and the lock protection is made to stop the operation (Step 106).

Figure 5B:
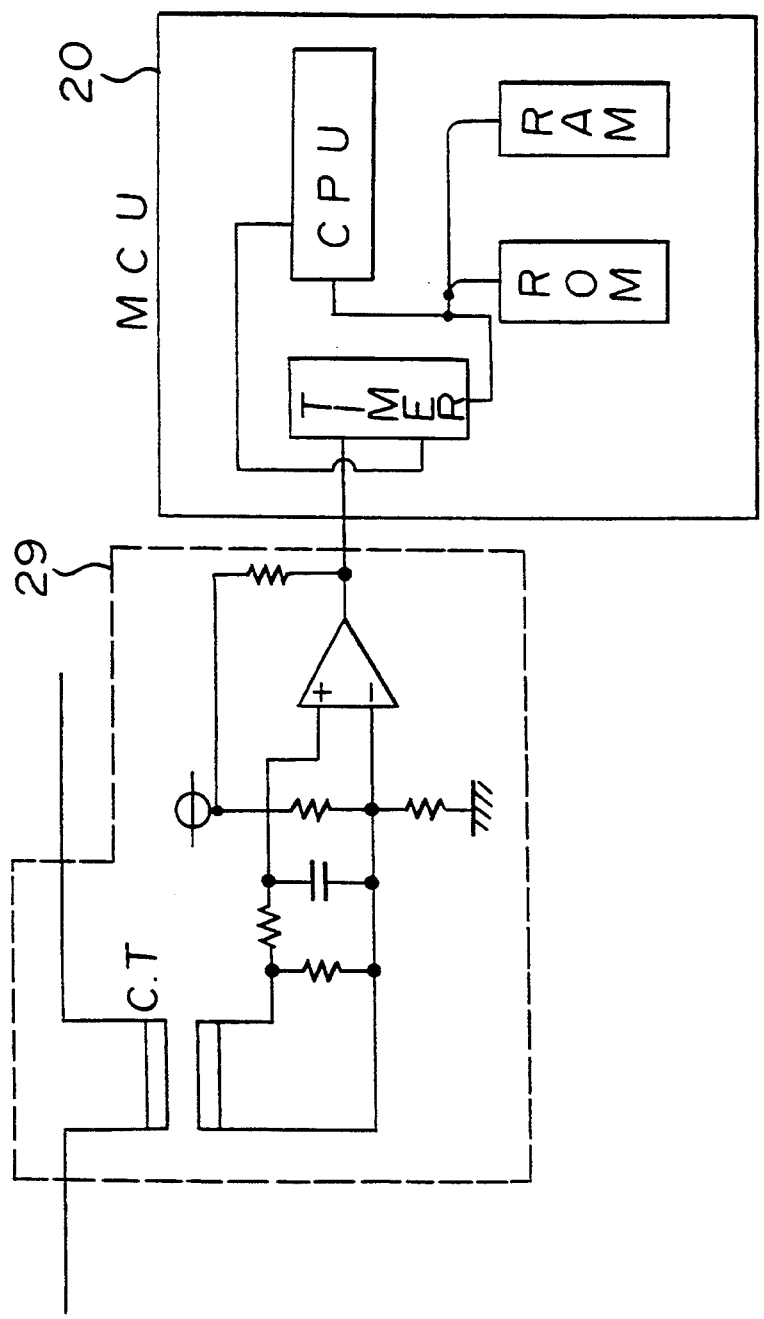
FIG. 5B is a circuit diagram which can carry out the steps of FIG. 5A.

The steps in the flowchart of the second embodiment can be carried out by e.g. a circuit which is shown in FIG. 5B.

EMBODIMENT 3

Figure 7:
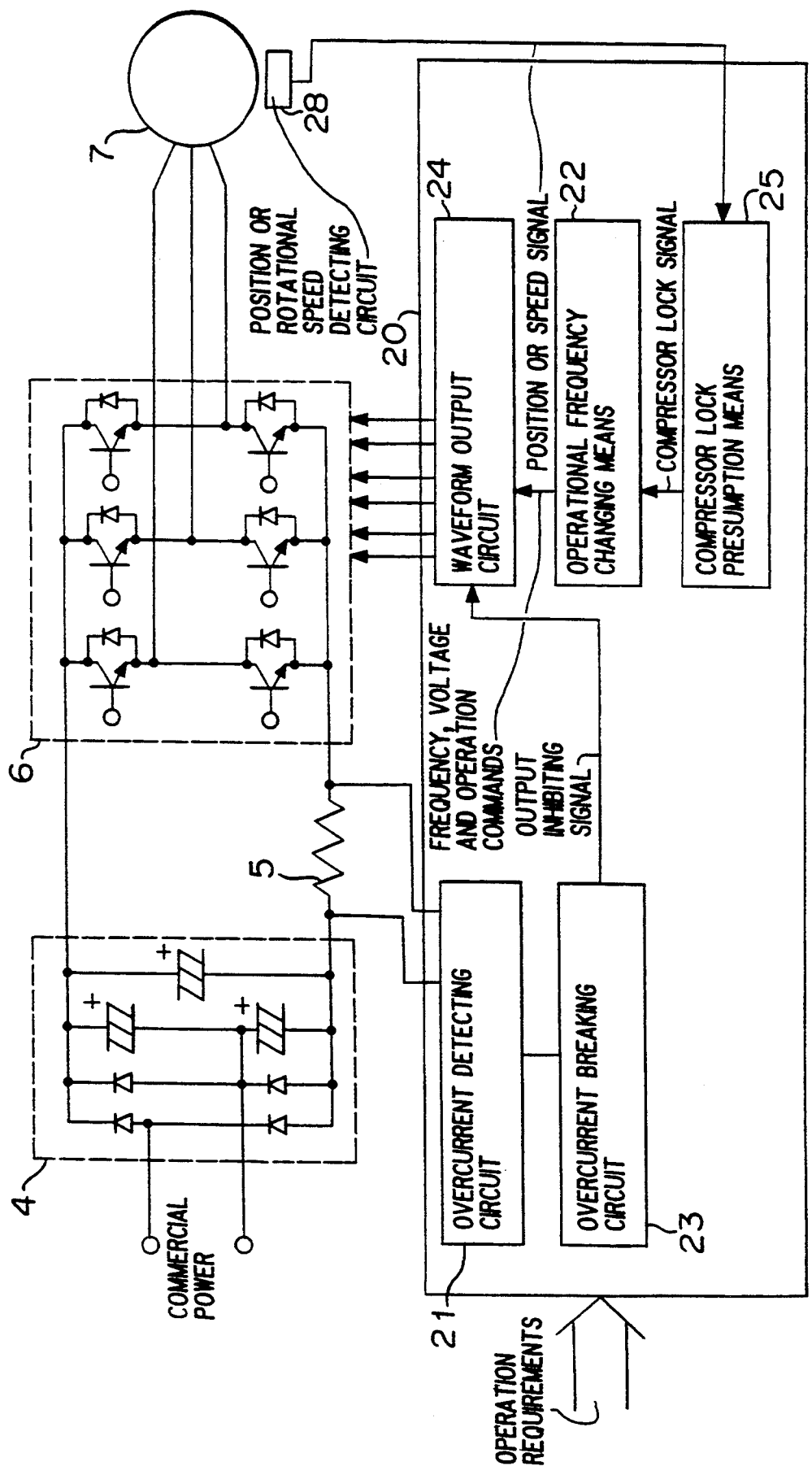
FIG. 7 is a block diagram of a controller for an inverter air conditioner according to a third embodiment of the present invention in which compressor speed or position is monitored to presume occurrence of compressor lock.

Referring now to FIG. 7, there is shown a block diagram of the inverter air conditioner according to a third embodiment of the present invention. In FIG. 7, reference numeral 28 designates a position detecting circuit, or a rotational speed detecting circuit which detects a rotational position, as have been disclosed in Japanese Unexamined Patent Publication No. 45193/1991. Reference numeral 25 designates compressor lock presumption means which presumes, based on an output from the position detecting circuit or the rotational speed detecting circuit, whether the compressor is locked or not. Other elements are similar to those of the first embodiment.

The operation of the third embodiment will be explained. In accordance with the third embodiment, it is possible to presume a compressor lock easily by directly detecting a position or speed of the compressor. If the compressor lock is determined based on only a signal from the position or speed detecting circuits to make overcurrent breaking, there is a possibility that lock protection is activated to stop the operation during a circuit failure as well. When the compression mechanism is driven by an induction motor in the compressor, it is possible to drive the motor in practice even if a position or speed can not be detected. It is possible to drive the motor even at circuit failure by treating the result of position detection or speed detection as being presumed. Raising an operational frequency allows overcurrent protection to be effective even if the compressor is mechanically locked, thereby ensuring safety.

Figure 8:
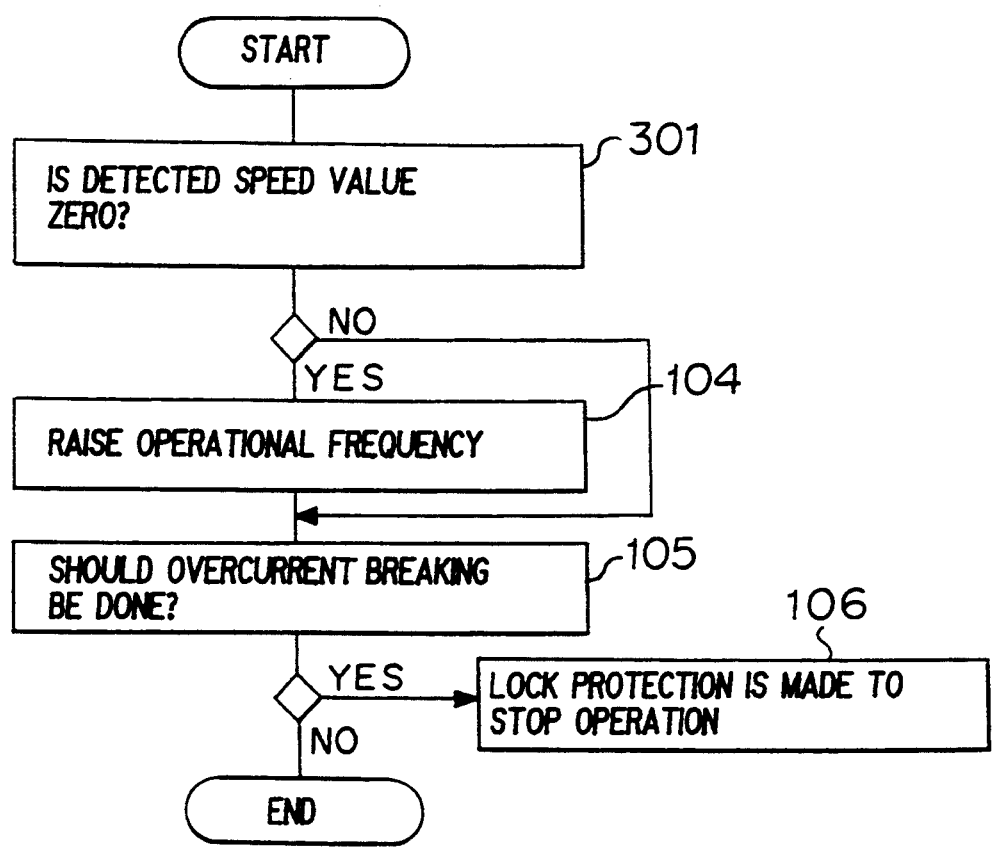
FIG. 8 is a flowchart of the operation of the third embodiment.
Figure 9:
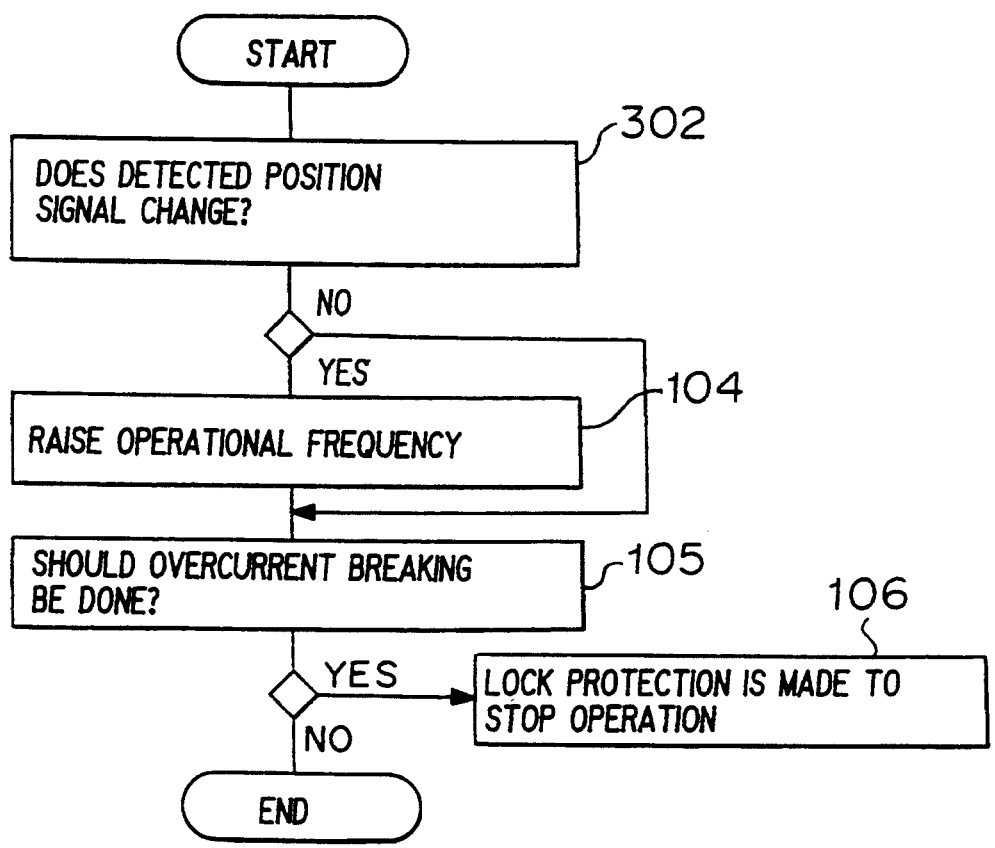
FIG. 9 is a flowchart of the operation of the third embodiment.

The process of a lock protection will be explained, in reference to the flow charts of FIGS. 8 and 9. First, based on a position or speed signal from the position or speed detecting circuit 28 shown in FIG. 7, it is presumed whether the compressor is locked or not, i.e. whether a detected speed value is zero or not (Step 301), or whether a position detecting signal changes or not (Step 302). If affirmative, the present operational frequency is raised (Step 104). Next, it is determined whether overcurrent breaking should be activated or not (Step 105). If affirmative, it is determined that the compressor is mechanically locked, and a lock protection is made to stop the operation (Step 106).

Figure 10:
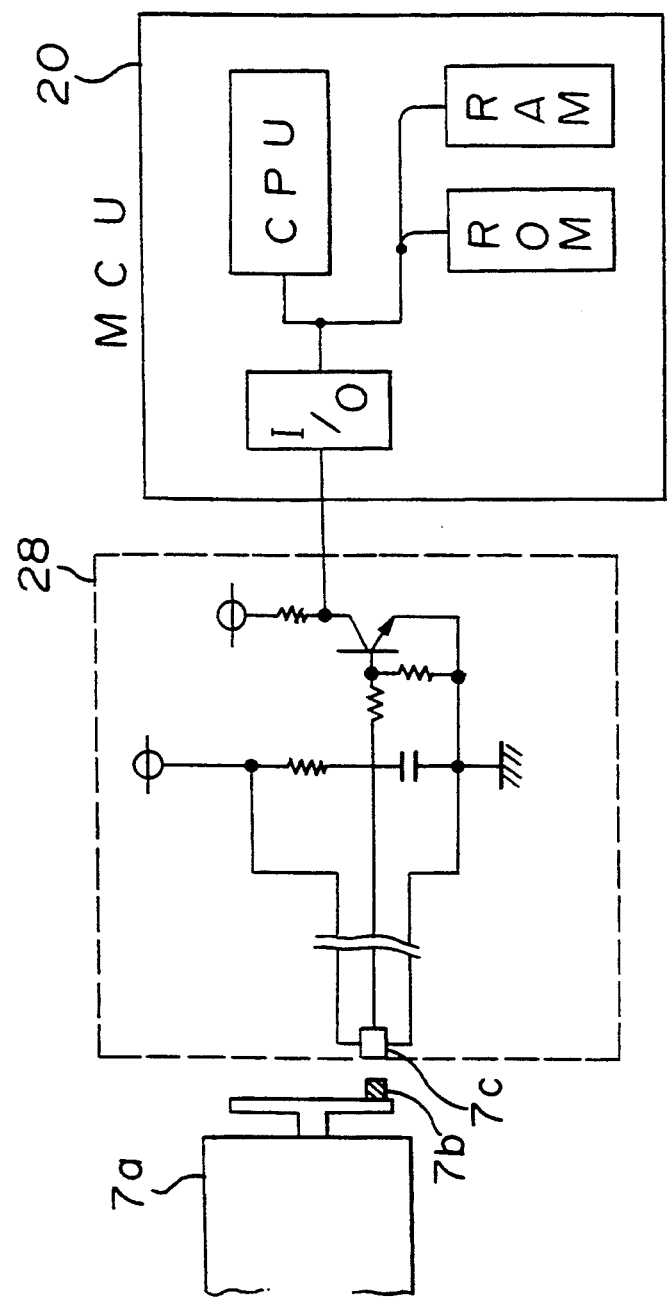
FIG. 10 is a circuit diagram which can carry out the steps of FIG. 8 and 9.
Figure 11:
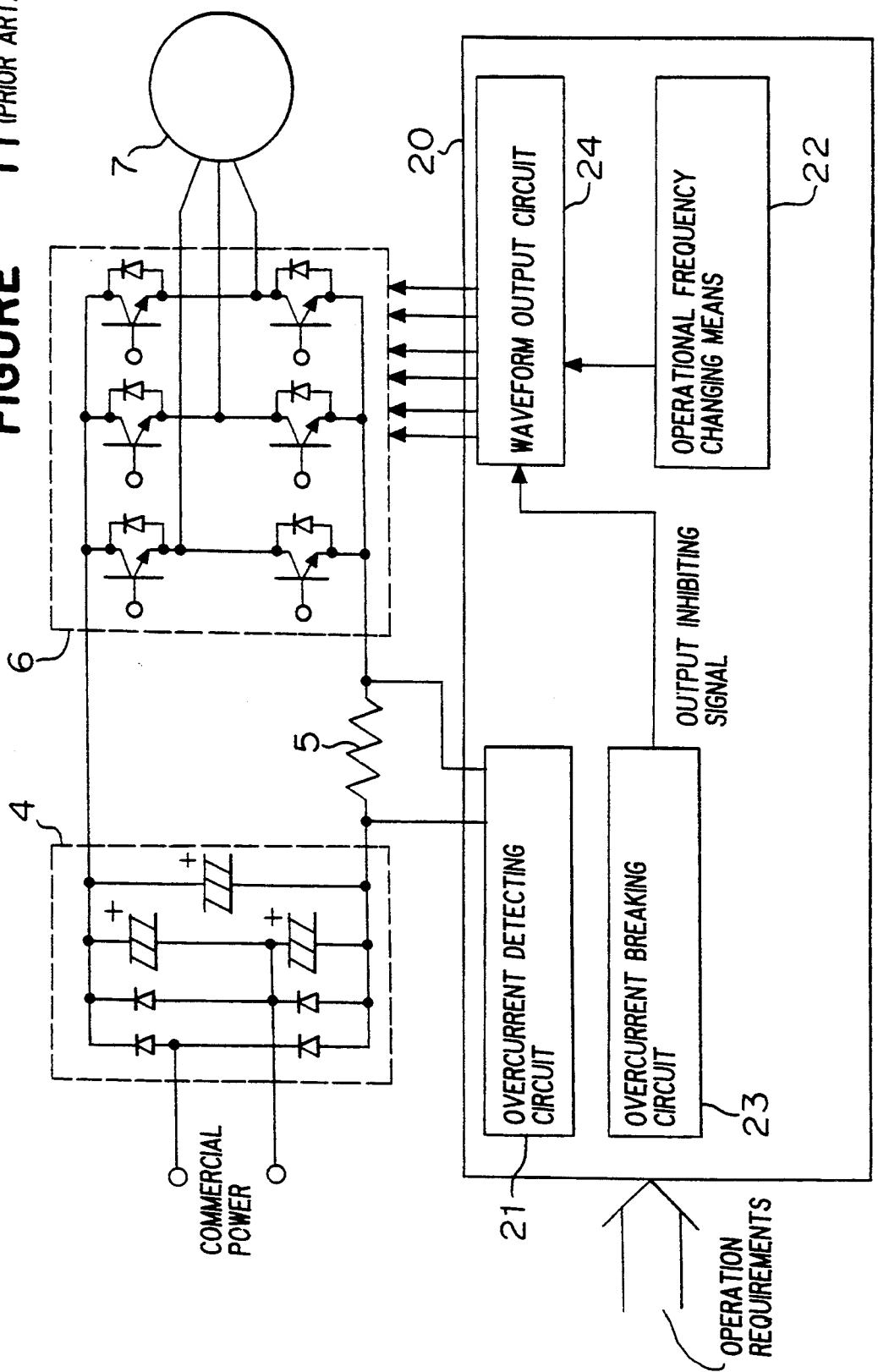
FIG. 11 is a block diagram of a controller of a conventional inverter air conditioner.

The steps in the third embodiment can be carried out by e.g. a circuit which is shown in FIG. 10. In FIG. 10, reference numeral 7a designates a rotor of the compressor 7, and reference numeral 7b designates a magnet which is arranged at one end of the rotor. Reference numeral 7c designates a hole IC which is used to detect a speed or a position of the rotor in response to a magnetic force from the magnet 7b.

I claim:
1. An inverter air conditioner comprising:
   an ac/dc converter means for changing input ac power into dc power;
   a dc/ac inverter means for changing said dc power into ac power having a desired frequency and a desired voltage;
   a compressor driven by said ac power;
   compressor lock presumption means for preliminarily determining whether or not compressor lock has occurred;
   frequency increasing means for increasing an operational frequency of said compressor to a predetermined value when it is preliminarily determined that compressor lock has occurred, said predetermined value being such that an operational current value reaches an overcurrent detection level if compressor lock has occurred; and
   lock protection means for activating an overcurrent breaker to stop the compressor when the operational current is detected by an overcurrent detection circuit to reach said overcurrent detection level after increasing said operational frequency to said predetermined value.

2. An inverter air conditioner according to claim 1, wherein the compressor lock presumption means preliminarily determines the compressor lock according to an operational frequency and an inverter input current value.

3. An inverter air conditioner according to claim 1, wherein the compressor lock presumption means preliminary determines the compressor lock according to a correction quantity of an input voltage to the compressor.

4. An inverter air conditioner according to claim 1, wherein the compressor lock presumption means preliminary determines the compressor lock according to an output signal from either one of a speed detector and a position detector.

* * * * *